US011580307B2

(12) United States Patent
Chhaya et al.

(10) Patent No.: US 11,580,307 B2
(45) Date of Patent: Feb. 14, 2023

(54) WORD ATTRIBUTION PREDICTION FROM SUBJECT DATA

(71) Applicant: Adobe Inc., San Jose, CA (US)

(72) Inventors: Niyati Himanshu Chhaya, Hyderabad (IN); Sopan Khosla, Pittsburgh, PA (US); Balaji Vasan Srinivasan, Bangalore (IN)

(73) Assignee: Adobe Inc., San Jose, CA (US)

( * ) Notice: Subject to any disclaimer, the term of this patent is extended or adjusted under 35 U.S.C. 154(b) by 278 days.

(21) Appl. No.: 16/825,864

(22) Filed: Mar. 20, 2020

(65) Prior Publication Data

US 2021/0294978 A1    Sep. 23, 2021

(51) Int. Cl.
| | |
|---|---|
| *G06F 16/35* | (2019.01) |
| *G06F 40/30* | (2020.01) |
| *G06N 3/04* | (2023.01) |
| *G06F 40/289* | (2020.01) |
| *G06N 3/08* | (2023.01) |

(52) U.S. Cl.
CPC ............ *G06F 40/30* (2020.01); *G06F 40/289* (2020.01); *G06N 3/0445* (2013.01); *G06N 3/0454* (2013.01); *G06N 3/08* (2013.01)

(58) Field of Classification Search
CPC ........ G06F 40/30; G06F 40/289; G06F 16/35; G06F 40/20; G06F 16/285; G06F 16/367; G06N 3/0445; G06N 3/0454; G06N 3/08; G06N 7/005; G06N 20/00; G06Q 30/02; G06Q 30/0201; G06Q 10/10
See application file for complete search history.

(56) References Cited

U.S. PATENT DOCUMENTS

| | | | |
|---|---|---|---|
| 9,405,741 B1* | 8/2016 | Schaaf | G10L 13/00 |
| 10,621,616 B2* | 4/2020 | Krishnan | G06Q 30/0254 |
| 2020/0126533 A1* | 4/2020 | Doyle | G10L 15/1815 |

OTHER PUBLICATIONS

Wiedemann, Gregor, et al. "Transfer learning from lda to bilstm-cnn for offensive language detection in twitter." arXiv preprint arXiv: 1811.02906 (2018) (Year: 2018).*
"A game theoretic approach to explain the output of any machine learning model", Retrieved at: https://github.com/slundberg/shap— on Feb. 17, 2020, 10 pages.
Godin,"Explaining Character-Aware Neural Networks for Word-Level Prediction: Do They Discover Linguistic Rules?", Aug. 28, 2018, 13 pages.
Jain,"Attention is not Explanation", May 8, 2019, 16 pages.
Kim,"Convolutional Neural Networks for Sentence Classification", Oct. 2014, pp. 1746-1751.

(Continued)

*Primary Examiner* — Jakieda R Jackson
(74) *Attorney, Agent, or Firm* — FIG. 1 Patents

(57) ABSTRACT

A digital attribution system is described to generate predictions of word attributions from subject data, e.g., titles, subject lines of emails, and so on. To do so, an attribution score is first generated by the digital attribution system that describe an amount to which respective words in the subject data cause performance of a corresponding outcome. The attribution scores are then used by the digital attribution system to generate representations for display in a user interface for respective words in the subject data and may also be used to generate attribution recommendations of changes to be made to the subject data.

20 Claims, 12 Drawing Sheets

(56) References Cited

OTHER PUBLICATIONS

Murdoch, "Beyond Word Importance: Contextual Decomposition to Extract Interactions from LSTMs", Apr. 27, 2018, 15 pages.
Ribeiro, ""Why Should I Trust You?" Explaining the Predictions of Any Classifier", In Proceedings of the 22nd ACM SIGKDD International Conference on Knowledge Discovery and Data Mining, Aug. 7, 2016, 10 pages.
Ribeiro, "Anchors: High-Precision Model-Agnostic Explanations", Oct. 2018, 9 pages.
Shrikumar, "Learning Important Features Through Propagating Activation Differences", Oct. 12, 2019, 9 pages.
Socher, "Recursive Deep Models for Semantic Compositionality Over a Sentiment Treebank", Jan. 2013, 12 pages.
Sundararajan, "Axiomatic Attribution for Deep Networks", Jun. 13, 2017, 11 pages.
Tai, "Improved Semantic Representations from Tree-Structured Long Short-Term Memory Networks", ACL 2015, Jul. 26, 2015, pp. 1556-1566.

* cited by examiner

WORD ATTRIBUTION PREDICTION FROM SUBJECT DATA

BACKGROUND

Typical users of computing devices such as mobile phones, tablets, desktop computers, smart TVs, and so forth are exposed to ever increasing amounts of digital content. Examples of digital content include digital messages (e.g., email), digital videos, digital audio, digital images, digital books, and so forth.

Oftentimes, digital content is represented using subject data and a user's decision on whether to interact with the digital content is based solely on this data. In one example, a user device may receive an email with a subject line "Office Supply Sale—Short Time Only" and a decision is made by a user of the computing device on whether to open the email based on this subject line. Similar examples include use of titles to represent digital videos, images, audio, and books by both professionals and amateurs, e.g., as part of content sharing systems. Thus, subject data is one of the primary ways in which creators of this digital content may encourage an outcome, e.g., to open the digital content, stream a digital movie, and so forth.

Although conventional techniques have been developed to provide tools to aid content creators in creating subject data, these conventional techniques typically employ "black box" approaches that are difficult to interpret. Accordingly, conventional techniques often fail to provide insight as to why a particular collection of subject data is evaluated in a particular way and thus are difficult to gain actionable insight and lack accuracy.

SUMMARY

Digital attribution techniques and systems are described to generate predictions of word attributions from subject data, e.g., titles, subject lines of emails, and so on. A prediction of word attribution describes an amount to which respective words in the subject data cause performance of a corresponding outcome through use of an attribution score. The attribution scores are then used by the digital attribution system to generate representations for display in a user interface for respective words in the subject data and may also be used to generate attribution recommendations of changes to be made to the subject data. In this way, the digital attribution system provides actionable insight into how individual words, phrases, and sentences in the subject data effect occurrence of an outcome, e.g., opening an email, playing a digital video, purchasing a book, and so forth, which is not possible in conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
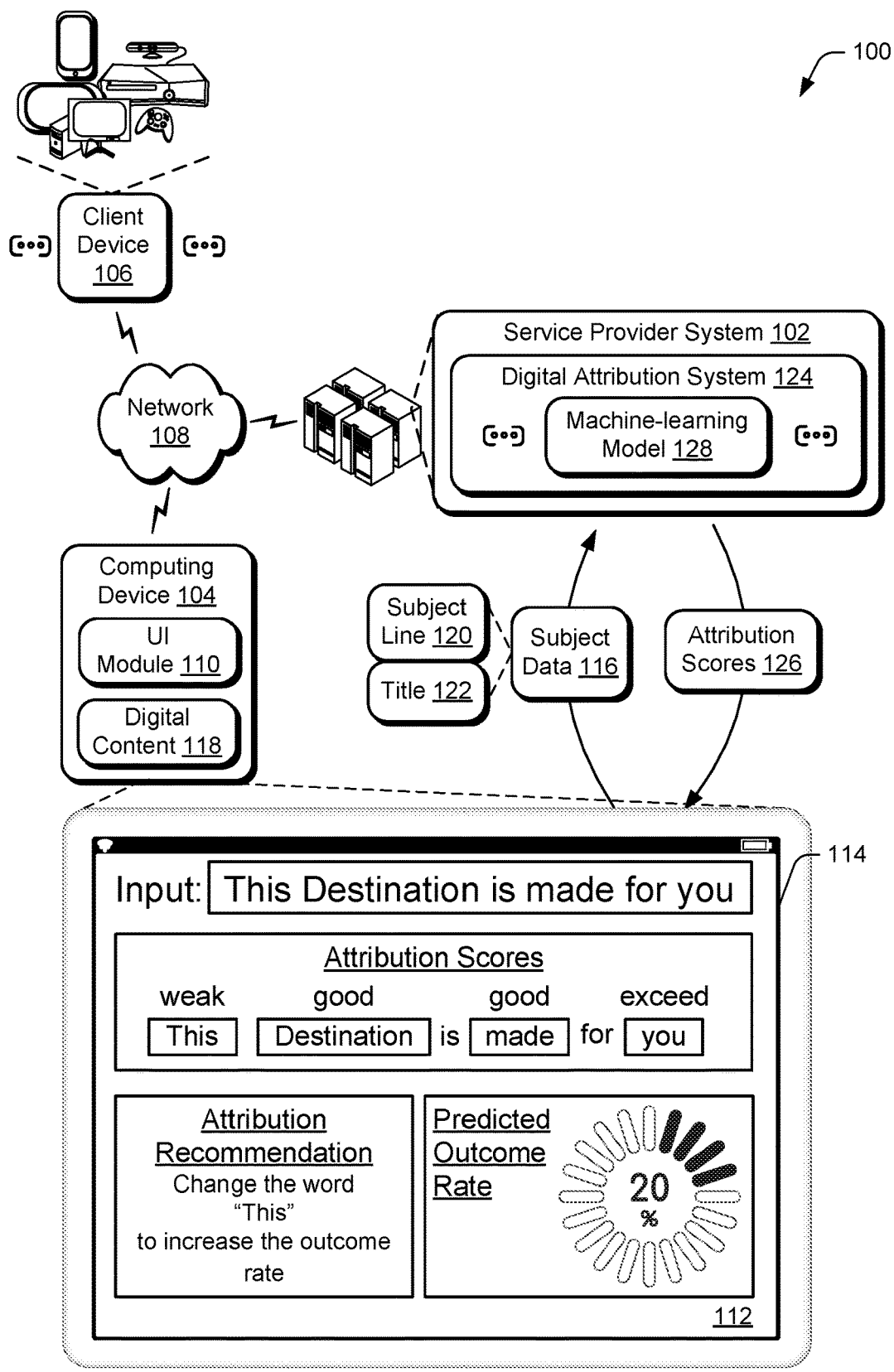
FIG. 1 is an illustration of a digital medium environment in an example implementation that is operable to employ word attribution prediction techniques described herein.

Subject data used to describe associated digital content is one of the primary ways in which content creators influence user performance of a desired outcome with respect to the digital content, e.g., to open an email, purchase a digital book, initiate streaming of a digital movie, and so forth. Although conventional techniques have been developed for computing devices to aid creation of subject data, these techniques typically employ "black box" approaches that are difficult for content creators to interpret. Accordingly, conventional techniques often fail to provide accurate insight as to why a particular collection of subject data is evaluated in a particular way and thus are difficult for users to gain actionable insight, e.g., what should or should not be changed in the subject data to achieve the outcome.

Accordingly, systems and techniques are described to generate predictions of word attributions from subject data, e.g., titles, subject lines of emails, and so on. A prediction of word attribution describes an amount to which respective words in the subject data cause performance of a corresponding outcome through use of an attribution score. In an example in which the digital content is configured as an email, for instance, a digital attribution system is employed to predict attribution scores describing respective amounts individual words included in a subject line of the email are attributed to causing the email to be opened. The attribution scores as describing the respective amounts of attribution for respective words, phrases, and the subject line as a whole may be leveraged in a variety of ways.

In a first example, the attribution scores are used by the digital attribution system to generate representations for display in a user interface for respective words in the subject data. In this way, the digital attribution system described herein provides actionable insight into how individual words, phrases, and sentences in the subject data effect occurrence of an outcome, e.g., opening an email, playing a digital video, purchasing a book, and so forth.

The digital attribution system, for instance, may receive an input including subject data that is to be used as part of digital content, e.g., a subject line of an email, title of digital content, and so forth. The digital attribution system then employs an attribution scoring module that is configured to generate attribution scores for at least a subset of words included in the subject data. The digital attribution system, for instance, may form the subset by first filtering out words that are not descriptive, have been found as not influential on an outcome, and/or are not supported by the attribution scoring module. For a subject line of an email, for instance, the subject data may include "this destination is made for you" and the subset if formed by removing the word "is."

The subset of the subject data is then processed by a plurality of machine-learning models to generate respective attribution scores indicative of an amount a respective word contributes toward causing an outcome, for which, the models have been trained. Continuing the example above, for instance, machine-learning models including convolutional neural networks, long short-term memory (LSTM) neural networks, and so on may be used to generate respective attribution scores for individual words in the subject data, e.g., to predict whether an email will be opened.

The machine-learning models are trained, for instance, using training data describing respective words and outcomes for different types of digital content to predict a probability of an outcome. Contextual decomposition techniques are then used to capture amounts of contributions of individual words, combinations of words (e.g., phrases and sentences), and so on in the subject data towards an outcome predicted by the models in order to generate the attribution scores for individual words. The attribution scores may then be aggregated from the models to generate representations of an amount the respective words are attributed to causing the outcome, may be generated individually for respective machine-learning models such that a user is made aware of which model type (e.g., CNN, LSTM, etc.) predicted a corresponding attribution score, and so forth.

Representations of the amounts exhibited by the attribution scores may be configured in a variety of ways. In a first instance, the representations are color coded to depict positive (e.g., green), negative (e.g., red), or neutral amounts of attribution for respective words in the subject data. Colors may also be used to indicate relative amounts, e.g., different shades of green for positive attribution and shades of red for negative attribution. In a second instance, the representations are textual, such as to indicate the amounts using "detrimental," "weak, "good," "exceed," and so forth as displayed adjacent to corresponding words in a user interface. Graphical representations may also be employed, e.g., a gauge displayed in a user interface having gradations between positive and negative amounts. In this way, the representations provide actionable intelligence via a user interface to indicate an effect and relative amounts of this effect of different parts of the subject data on influencing the outcome.

The attribution scores may also be leveraged to generate attribution recommendations regarding changes to the subject data. Continuing the "this destination is made for you" example, the digital attribution system may generate an attribution recommendation of "change the word 'this' to increase the outcome rate" and therefore guide a content creator in ways to increase likelihood that the email will be opened. Further discussion of training of machine-learning models and use of the models to generate attribution scores is described in a corresponding section in the following discussion.

Additionally, as described above attribution scores may be generated by the digital attribution system using a plurality of different machine-learning models, e.g., CNN, LSTMs, and so forth. Accordingly, the digital attribution system may also be configured to support analysis of function of the different machine-learning models in generating the predictions of word attributions from the subject data. The digital attribution system, for instance, may employ pattern analysis using benchmarking rules and patterns to rank model accuracy, output trends in a user interface, and so on. Further discussion of training of machine-learning model comparison and analysis is also described in a corresponding section in the following discussion.

Term Examples

"Attribution" describes an amount (e.g., a probability) that is assigned to an element as causing a respective outcome, e.g., a word in subject line as causing a user to open an email. An "attribution score" is prediction of word attribution describing an amount to which respective words in the subject data cause performance of a corresponding outcome.

A "machine-learning model" refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include convolutional neural networks (CNNs) and long short-term memory (LSTM) neural networks.

"Contextual decomposition" is a technique used to capture amounts of contributions of individual words, combinations of words (e.g., phrases and sentences), and so on towards an outcome. In one example, contextual decomposition is used based on an output of processing subject data by a machine-learning model to determine individual contributions of words within the subject data to the outcome predicted by the model.

A "word" is a single distinct meaningful element of speech or writing, which may be formed from alphabetic characters, punctuation, emojis, and so forth. A "phrase" includes a plurality of words, i.e., a group of words as a conceptual unit, which may be part of a larger unit, e.g., a sentence. A "sentence" is a set of words that is complete in itself, e.g., as including a subject and predicate.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ word attribution prediction techniques described herein. The illustrated environment 100 includes a service provider system 102, a computing device 104, and a plurality of client devices 106 that are communicatively coupled, one to another, via a network 108, e.g., the Internet. Computing devices that implement the service provider system 102, computing device 104, and client devices 106 may be configured in a variety of ways.

A computing device, for instance, may be configured as a desktop computer, a laptop computer, a mobile device (e.g., assuming a handheld configuration such as a tablet or mobile phone as illustrated for computing device 104), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown in instances, a computing device may be representative of a plurality of different devices, such as multiple servers utilized by a business to perform operations "over the cloud" as described in FIG. 12 and as illustrated for the service provider system 102.

The computing device 104 is depicted as including a UI module 110 that is configured to generate a user interface 112, illustrated as being rendered by a display device 114 of the computing device 104. The user interface 112 is configured to aid in generating subject data 116 that is to be associated with digital content 118. Digital content 118, for instance, may be configured in a variety of ways, such as a digital message (e.g., email, instant message, direct message, social media post), digital image, digital video, digital audio, digital book, and so forth that are capable of being stored in computer-readable storage device, communicated via the network 108, and so forth. The subject data 116 is associated with the digital content 118 as representative of the digital content 118, e.g., as a subject line 120 of a digital message (e.g., email), title 122 of digital image, video, audio, book, and so forth. The subject data 116, for instance, may be user selectable (e.g., via spoken utterance, gesture, cursor control device) to cause output of the digital content 118.

As previously described, subject data 116 is one of the primary ways in which a creator of the digital content 118 may promote outcomes with respect to the digital content 118. Examples of outcomes include conversion of an associated good or service, selection of the subject data 116 to cause output of the digital content 118, initiate streaming of digital audio or digital video, and so forth. Accordingly, in the techniques described herein a digital attribution system 124 is employed to aid creation of subject data 116 to increase a likelihood that a corresponding outcome occurs, e.g., opening an email, streaming, etc. when exposed to users of client devices 106. Although illustrated as implemented remotely at the service provider system 102, functionality of the digital attribution system 124 may also be implemented as whole or part via locally at the computing device 104.

Figure 5:
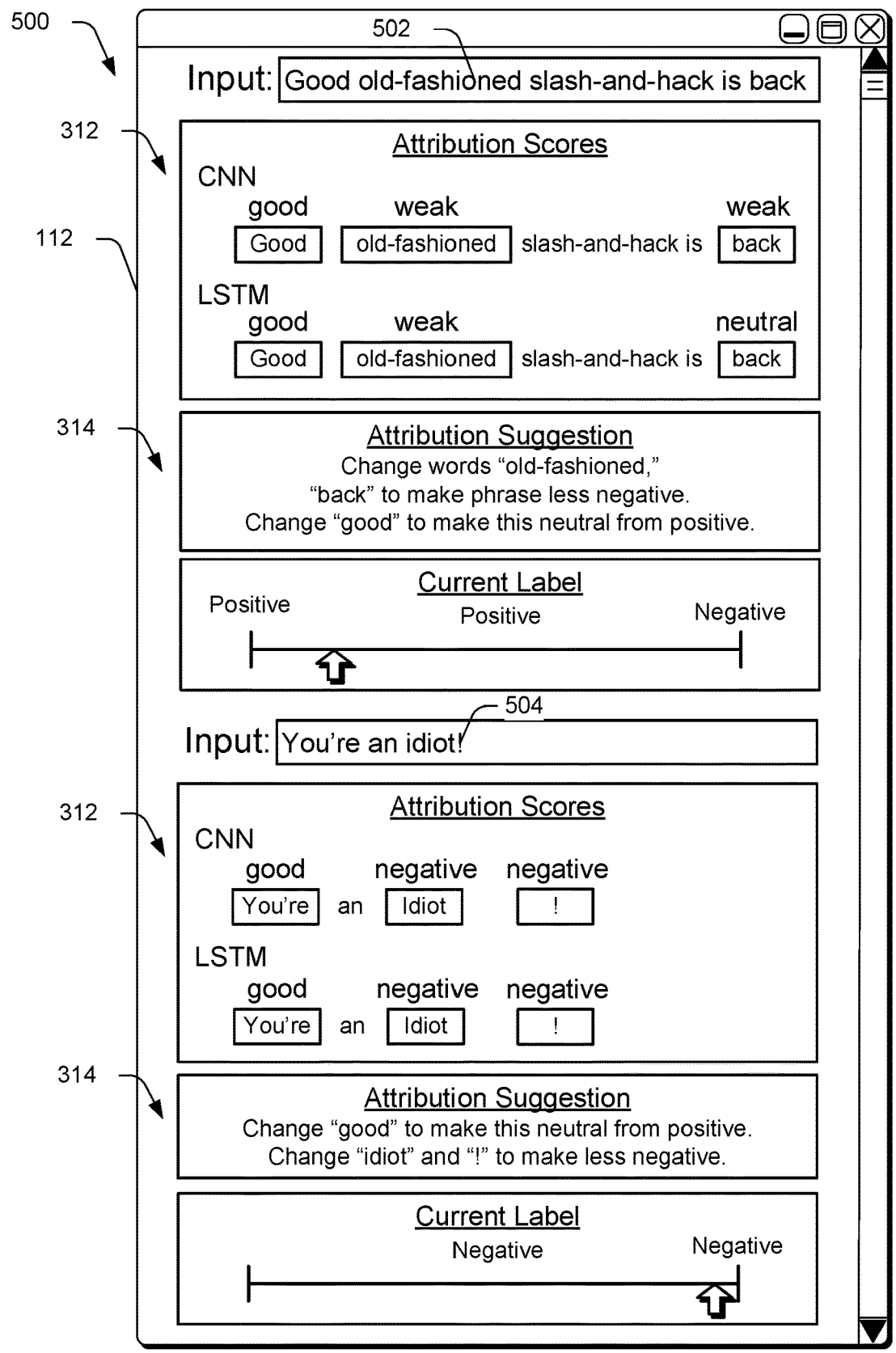
FIG. 5 depicts an example of attribution representations as output in a user interface that are usable to compare different sets of subject data to each other.

A content creator, for instance, may interact with the user interface 112 to provide an input of the subject data 116 having a plurality of words (and may include punctuation as shown in FIG. 5) to be associated with the digital content 118, e.g., "This destination is made for you" for an email. The subject data 116 is communicated to the digital attribution system 124 to generate attribution scores 126 for individual words (e.g., which may include punctuation or other non-alphabetic characters such as emojis) included in the subject data 116 using a plurality of machine-learning models 128 and contextual decomposition in this example. The attribution scores 126 indicate respective amounts of the words in the subject data 116 contribute toward a probability of a corresponding outcome, e.g., opening of an email and so on as previously described.

The attribution scores 126 may be employed in a variety of ways to provide insight into attribution of individual words (i.e., one or more subsets of alphabetic, text, or emojis) toward the outcome. In a first illustrated example, the attribution scores 126 are used to generate attribution representations as text associated with respective words indicating the corresponding amounts, e.g., "weak" for "this," "good" for "destination," "good" for "made" and "exceed" for "you." Other examples of attribution representations are also contemplated, such as color coding and shading, use of graphical objects (e.g., gauges), and so forth. In this way, the attribution recommendations provide insight into which words contribute positive, neutrally, or negatively toward the outcome and insight is gained as to what changes may be made to increase overall probability of the outcome.

The attribution scores 126 may also be leveraged to generate attribution recommendations that include suggested changes to individual words in the subject data 116. Continuing with the previous example, the word "This" is indicated as having a "weak" attribution towards the outcome, e.g., may actually negatively affect a probability of this outcome. Accordingly, an "Attribution Recommendation" is illustrated as "Change the word 'This' to increase the outcome rate." As a result, not only is the content creator made aware by the digital attribution system 124 of the effect of the individual words in the subject data 116 on achieving the outcome, but also how to increase this likelihood. These techniques may also be employed for phrases (e.g., a subset of words of the subject data 116) and/or the subject data 116 as a whole in a probability of achieving the outcome, an example of which is illustrated as a circular gauge for a predicted outcome rate of the subject data 116 as a whole. In this way, the content creator may interact with the user interface 112 and associated digital attribution system 124 to generate the subject data 116 to generate the digital content 118, e.g., as a subject line 120, title 122, and so forth of the content. Discussion of an example of training the machine-learning models 128 is included in the following description and shown in a corresponding figure.

Figure 2:
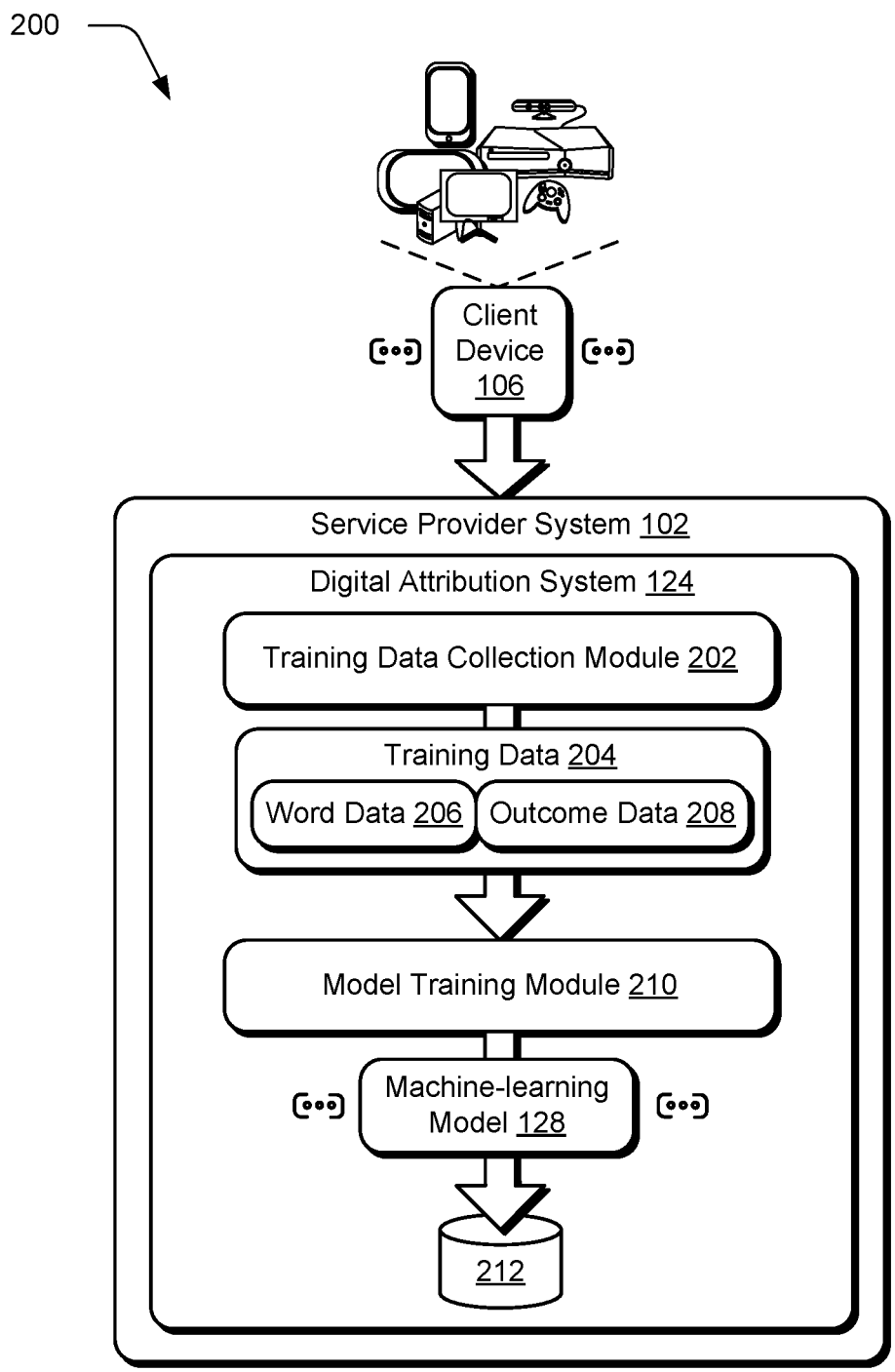
FIG. 2 depicts a system in an example implementation of training machine-learning models of a digital attribution system of FIG. 1 to generate attribution scores.

FIG. 2 depicts a system 200 in an example implementation of training the machine-learning models 128 of the digital attribution system 124 to generate attribution scores 126. As previously described, a variety of different types of machine-learning models 128 may be employed that are trained on a variety of different types of data. For example, a training data collection module 202 may collect training data 204 that describes user interaction via respective client devices 106, the user interaction involving word data 206 and outcome data 208. The training data 204, for instance, may describe user interaction with different types of digital content (e.g., digital messages, digital movies, etc.) and a result of whether a corresponding outcome occurred.

The training data 204 may also be collected for different subsets of this interaction. For example, a machine-learning model 128 for modeling email subject-lines may be trained based on the open rates can be built on the entire data of subject lines of an enterprise, on a subset of the data sent to a specific user segments, or on a subset of the data sent in a particular time frame (e.g., different epochs in time), on a subset of the data related to a specific campaign/product or on data across the industry, and so forth.

The training data 204 is then passed to a model training module 210 to train different types of machine-learning models, which once trained are illustrated as maintained in a storage device 212. A machine-learning model 128 refers to a computer representation that can be tuned (e.g., trained) based on inputs to approximate unknown functions. In particular, the term machine-learning model can include a model that utilizes algorithms to learn from, and make predictions on, known data by analyzing the training data 204 to learn to generate outputs that reflect patterns and attributes of the training data 204 on achieving an outcome described by the outcome data 208, e.g., whether an email was or was not opened, etc.

According to various implementations, such a machine-learning model uses supervised learning, semi-supervised learning, unsupervised learning, or reinforcement learning. For example, the machine-learning model 128 can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, and so on. Thus, a machine-learning model 128 makes high-level abstractions in data by generating data-driven predictions or decisions from the known input data, i.e., the training data 204 for respective outcomes. Further examples of the machine-learning model 128 as a long short-term memory (LSTM) neural network are described and shown in relation to FIGS. 7 and 8 and as a convolutional neural network (CNN) are described and shown in relation to FIG. 9.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Attribution System Word Attribution Prediction

Figure 3:
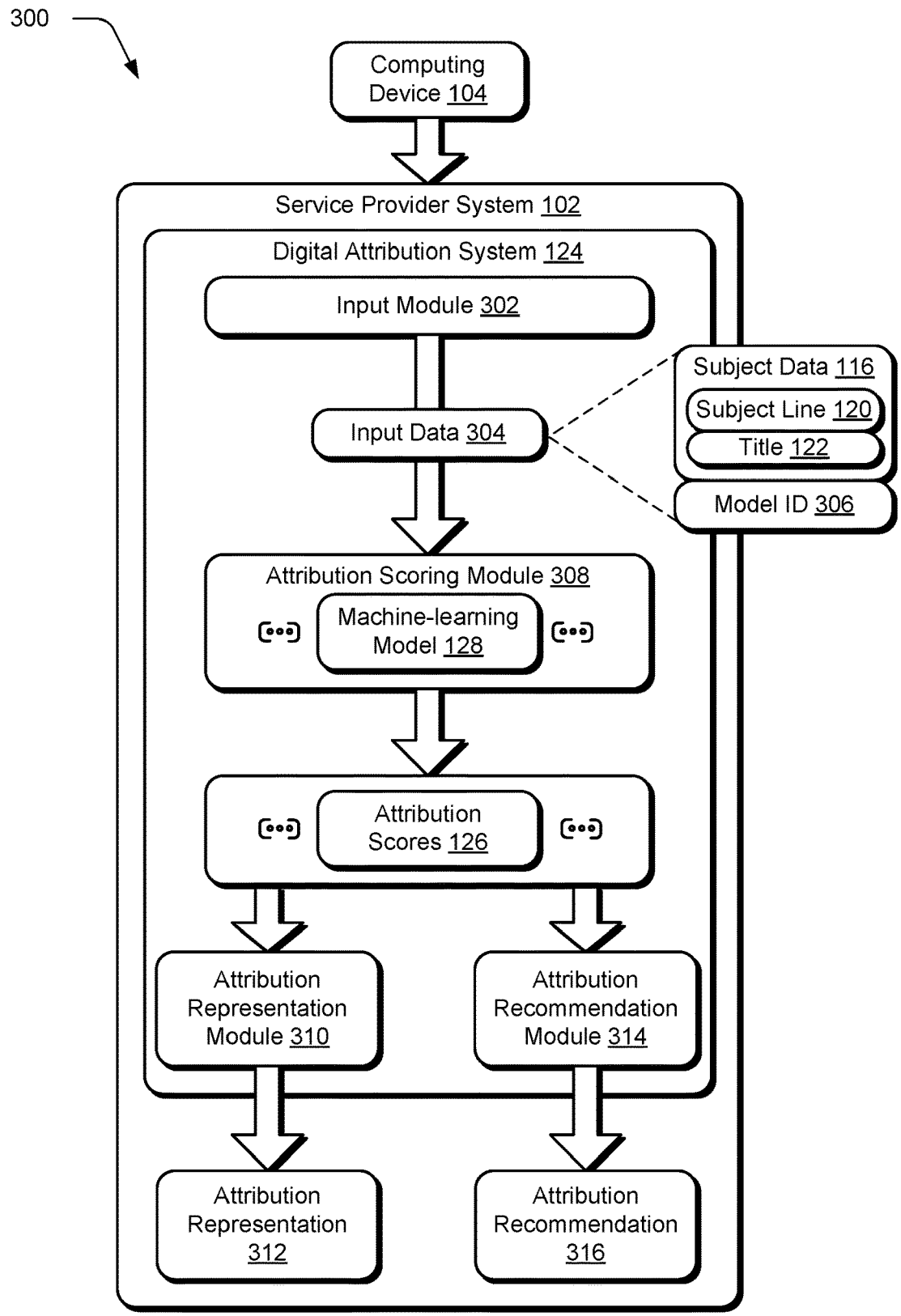
FIG. 3 depicts a system in an example implementation showing generation of attribution scores using the machine-learning models trained as described in relation to FIG. 2.
Figure 4:
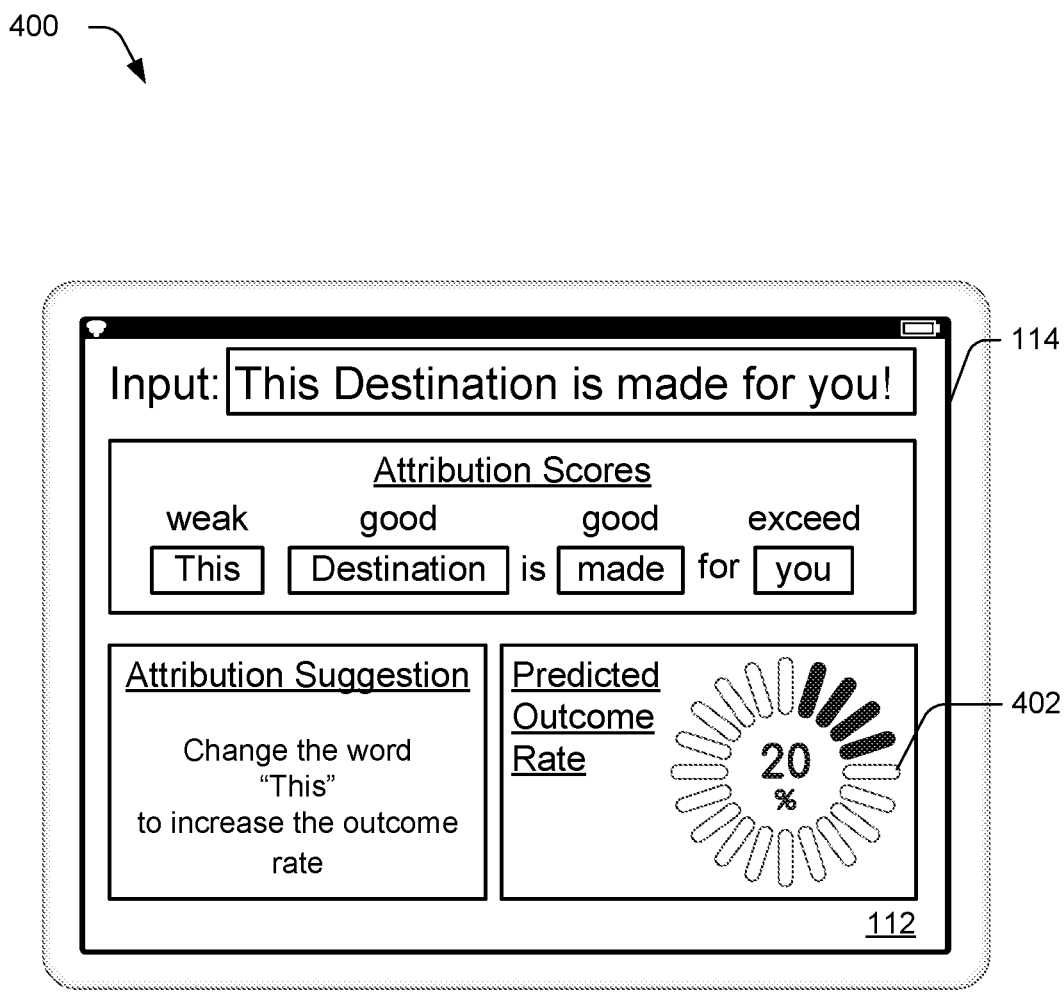
FIG. 4 depicts an example of attribution representations as output in a user interface, the attribution representations indicative of amounts of respective words in the subject data are attributed towards a likelihood of achieving an outcome.
Figure 6:
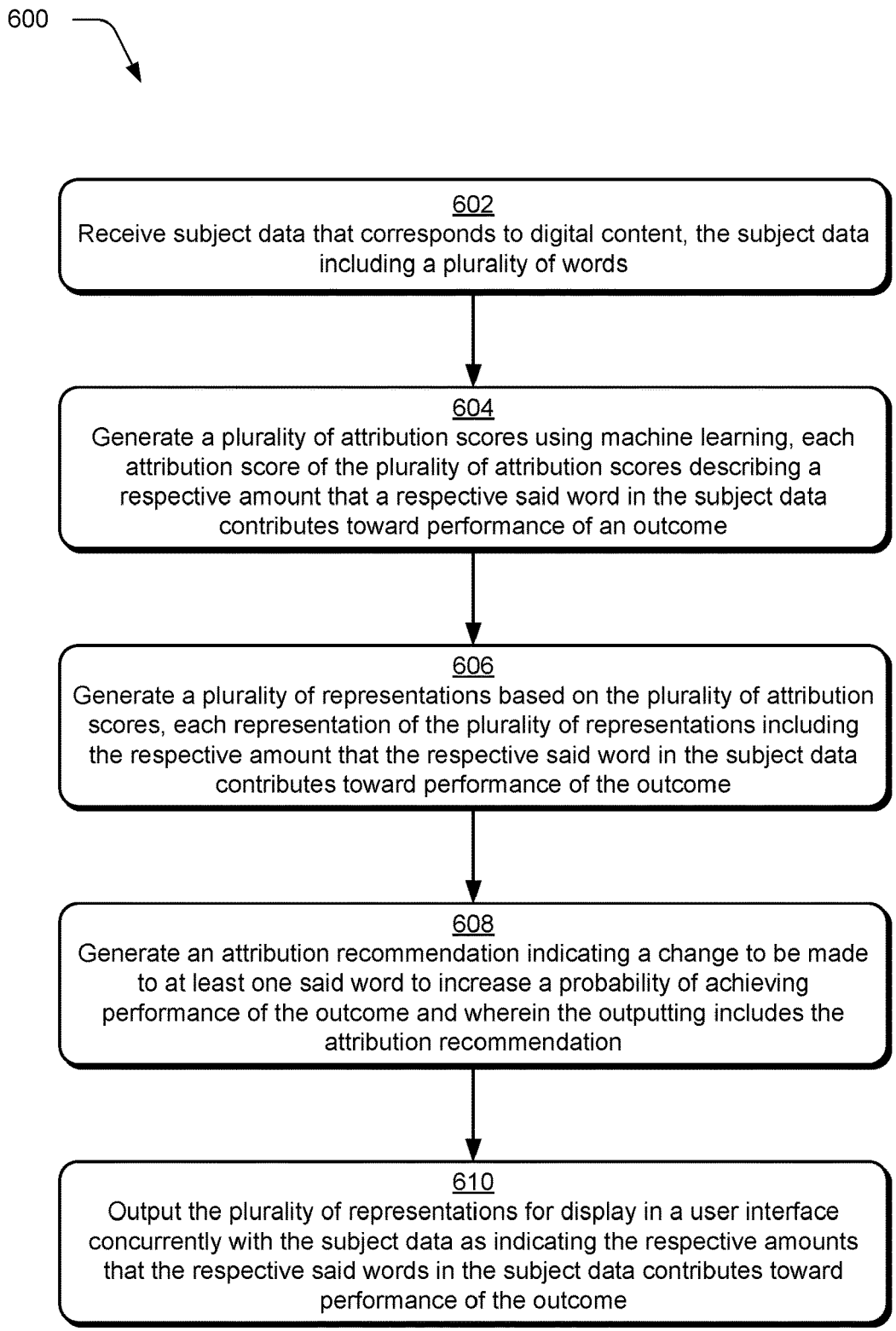
FIG. 6 is a flow diagram depicting a procedure in an example implementation in which attribution scores are generated and used as a basis to generate attribution representations for output in a user interface.
Figure 7:
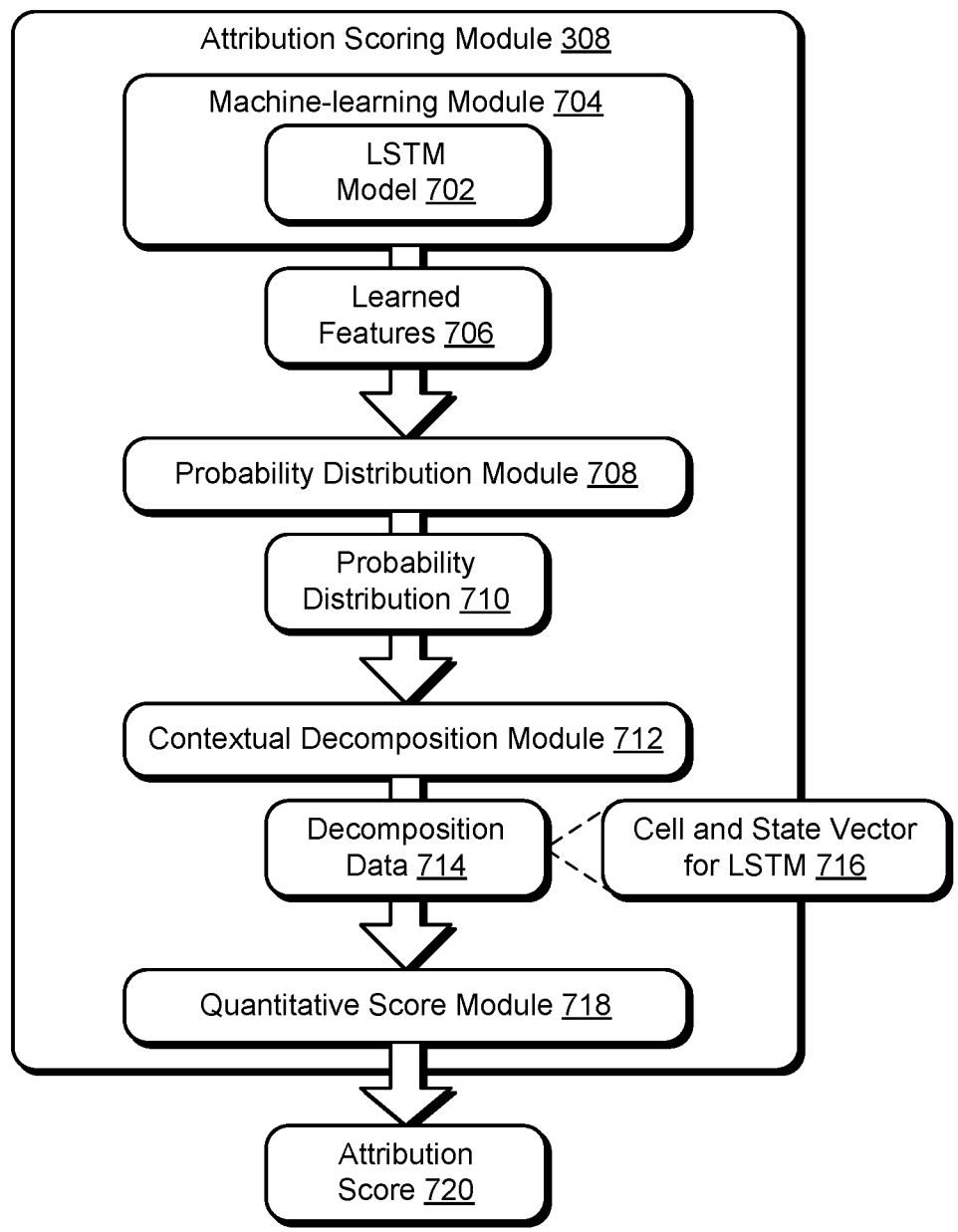
FIGS. 7-8 depict an example implementation and LSTM neural network in which the long short-term memory (LSTM) neural network is used to generate an attribution score.
Figure 8:
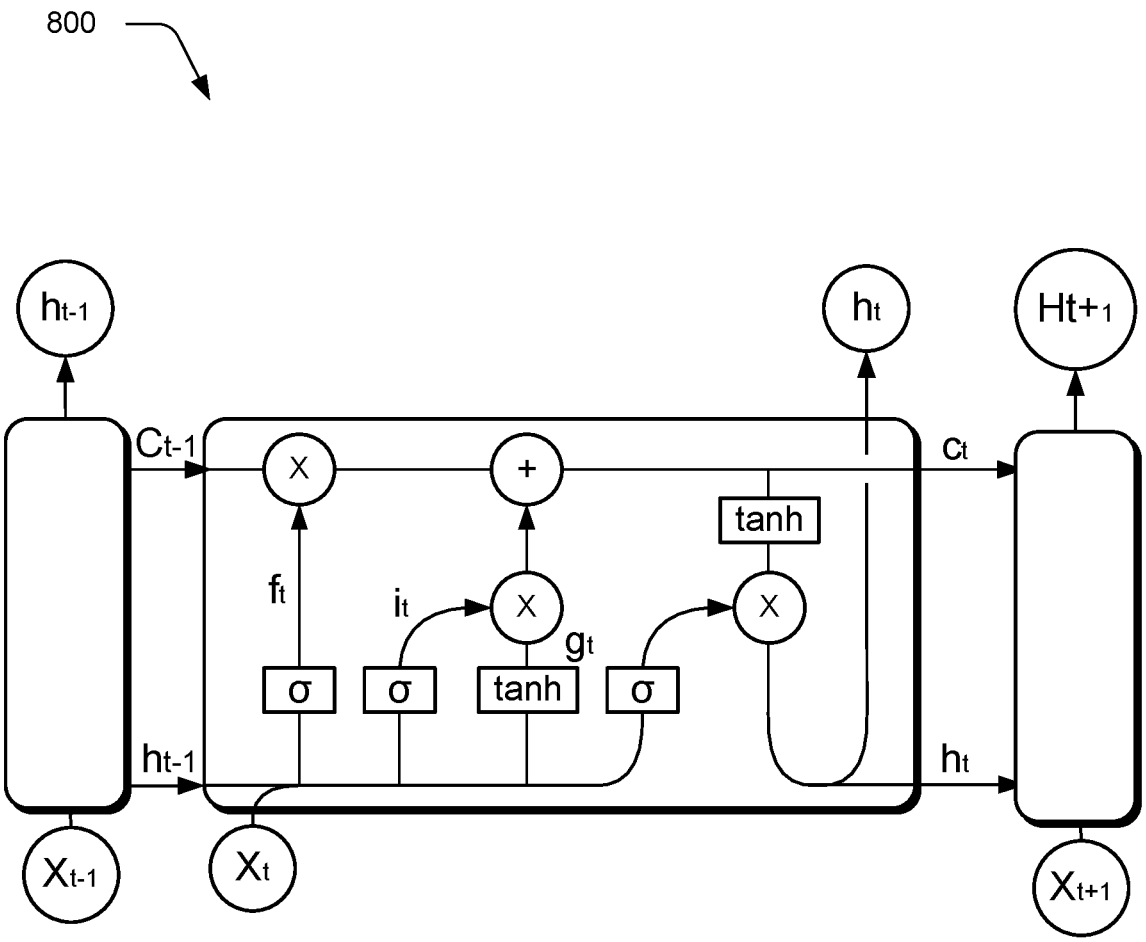
Figure 9:
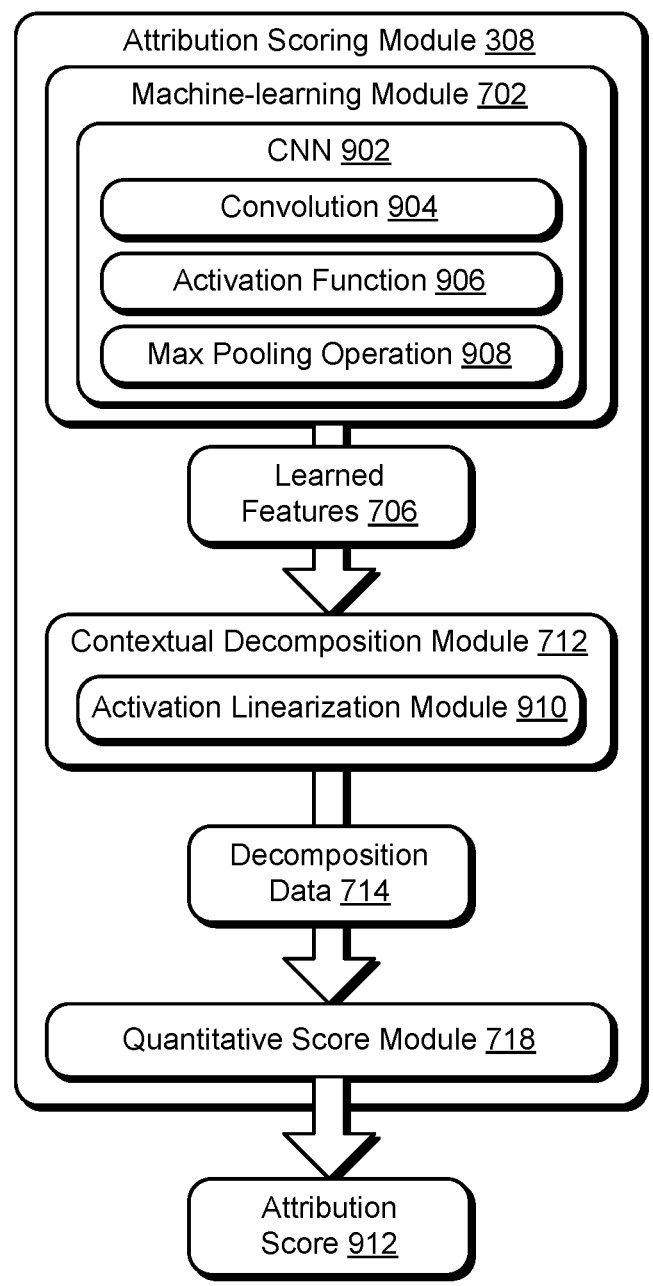
FIG. 9 depicts an example implementation in which a convolutional neural network (CNN) is used to generate an attribution score.

FIG. 3 depicts a system 300 in an example implementation showing generation of attribution scores using the machine-learning models trained as described in relation to FIG. 2. FIG. 4 depicts an example 400 of attribution representations as output in a user interface, the attribution representations indicative of amounts of respective words in the subject data are attributed towards a likelihood of achieving an outcome. FIG. 5 depicts an example 500 of attribution representations as output in a user interface that are usable to compare different sets of subject data to each other. FIG. 6 depicts a procedure 600 in an example implementation in which attribution scores are generated and used as a basis to generate attribution representations for output in a user interface. FIGS. 7-8 depict an example implementation 700 and LSTM neural network 800 in which the long short-term memory (LSTM) neural network is used to generate an attribution score. FIG. 9 depicts an example implementation 900 in which a convolutional neural network (CNN) is used to generate an attribution score.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

Figure 11:
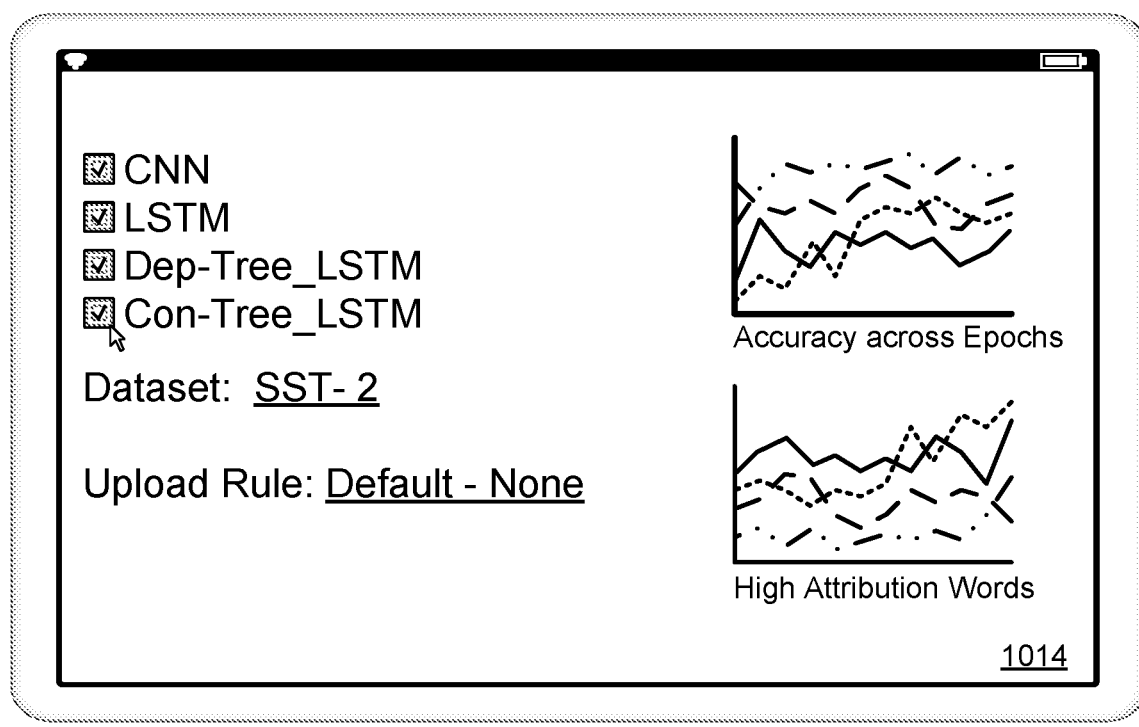
FIG. 11 depicts an example of a user interface configured to support machine-learning model comparison for attribution score generation.

To begin in this example, an input module 302 receives input data 304 from a computing device 104, e.g., via the network 108. The input data 304 includes subject data 116 that corresponds to digital content 118 and includes a plurality of words (block 602). As previously described, a word is a single distinct meaningful element of speech or writing, which may be formed from alphabetic characters, punctuation, emojis, and so forth. The subject data 116 may be configured in a variety of different ways as associated with a variety of types of digital content, e.g., a subject line 120 of an electronic communication, a title 122, and so forth. A phrase includes a plurality of words, i.e., a group of words as a conceptual unit, which may be part of a larger unit, e.g., a sentence. A sentence is a set of words that is complete in itself, e.g., as including a subject and predicate. The input data 304 may also include a model ID 306 specifying types of different machine-learning models 128 that are to be used to generate attribution scores, e.g., may be selected via a user interface as shown in FIG. 11 to specify particular models.

The input data 304 is then passed from the input module 302 to an attribution scoring module 308. The attribution scoring module 308 is configured to generate the plurality of attribution scores 126 using machine learning. Each attribution score of the plurality of attribution scores 126 describes a respective amount that a respective word in the subject data 116 contributes toward performance of an outcome (block 604). The machine-learning models 128, for instance, may generate predictions of a probability that the subject data 116 will cause an outcome, e.g., purchase a good or service, open an email, and so forth.

Contextual decomposition is then used by the attribution scoring module 308 to capture amounts of contributions of individual words, combinations of words (e.g., phrases and sentences), and so on towards this prediction, i.e., probability of achieving the outcome output by the model. Further examples of contextual decomposition as employed in conjunction with a LSTM neural network are described in relation to FIGS. 7-8 and a CNN are described in relation to FIG. 9. Contextual decomposition is used in the techniques described herein after output from respective machine-learning models and thus may be generalized to other models, e.g., as these models are developed and become available and as such use of these models by the digital attribution system 124 is extensible thereby improving operation and computational efficiency of the techniques described herein.

The attribution scores 126 generated by the digital attribution system 124 may be employed in a variety of ways. In one example, the attribution scores 126 are used by an attribution representation module 310 to generate a plurality of attribution representations 312. Each representation of the plurality of attribution representations 312 indicates a respective amount that a respective word in the subject data 116 contributes toward performance of the outcome (block 606). In one example, the representations are color coded to depict positive (e.g., green), negative (e.g., red), or neutral (e.g., gray) amounts of attribution for respective words in the subject data 116 towards the outcome. Colors may also be used to indicate relative amounts, e.g., different shades of green for positive attribution, different shades of red for negative attribution, and so on. In the example 400 of FIG. 4, the attribution representations 312 are textual, such as to indicate the amounts using text such as "weak, "good," "exceed," and so forth as displayed adjacent to corresponding words in a user interface 112.

Graphical representations may also be employed, e.g., a gauge displayed in a user interface having gradations between positive and negative amounts. Other examples are also contemplated, such as for phrases within the subject data 116 and/or the subject data 116 as a whole as illustrated using a gauge 402 indicating a likelihood of the subject data 116 on achieving the outcome. In this way, the representations provide actionable intelligence via a user interface 112 to indicate an effect and relative amounts of this effect of different parts of the subject data on influencing the outcome.

In another example, the attribution scores 126 are employed by an attribution recommendation module 314 to generate an attribution recommendation 316 indicating a change to be made to at least one word to increase a probability of achieving performance of the outcome (block 608). In the illustrated example of "this destination is made for you" in FIG. 4, the attribution recommendation module 314 generates the attribution recommendation 316 as "change the word 'this' to increase the outcome rate" in order to increase an overall probability of the subject data 116 as a whole in achieving the outcome, e.g., opening the email.

The plurality of representations 312 are then output (e.g., along with the attribution recommendation 316) for display in a user interface 112 concurrently with the subject data 116 as indicating the respective amounts that the respective said words in the subject data contributes toward performance of the outcome (block 610). As already described for the example 400 of FIG. 4, this may include output of textual or color representations disposed next to corresponding word in the subject data 116, representation of the probability of the subject data as a whole, as well as an attribution recommendation.

In an example 500 of FIG. 5, the user interface 112 is configured to output attribution representations 312 and attribution recommendations 316 concurrently for comparison of different sets (i.e., items, collections) of subject data 116. The user interface 112, for instance, includes a first set of subject data 502 and a second set of subject data 504. Attribution representations 312 are displayed for respective words in the subject data as well as for the subject data as a whole, e.g., using textual labels for the words as well as a graphical slider representation for the subject data as a whole. In this way, a content creator may enter a plurality of candidates including word, phrases, and sentences within the subject data concurrently in the user interface 112.

FIGS. 7-8 depict an example implementation 700 and LSTM neural network 800 in which the long short-term memory (LSTM) neural network is used to generate an attribution score. In this example, given a subject-line, a trained machine-learning model, and the associated model architecture, the objective is to provide word, phrase, and sentence level attribution scores that indicate relative importance toward the model—thus reasoning the predicted output. Contextual decomposition is leveraged to extract these attribution scores, which in this instance is for an LSTM neural network and in FIG. 9 for a CNN architecture. As described above, these techniques are extensible and as such can be generalized to any other type of machine-learning model.

Contextual decomposition (CD) captures the contributions of combinations of words, phrases, and so on to the final prediction of any given model by decomposing the output. Since the underlying model is not changed, such an approach is generalizable to different frameworks as described in the following discussion.

FIG. 8 depicts an example 800 of a long short-term memory (LSTM) model 702 as employed by a machine-learning module 704 to generate learned features 706. Given a sequence of word embeddings x1, ..., xT∈ R d1, a cell and state vector ct, ht∈ R are computed for each element by iteratively applying the below equations, with initializing the first hidden and context vectors to h0=c0=0.

$$o_t=\sigma(W_o x_t + V_o h_{t-1} + b_o) \quad (1)$$

$$f_t=\sigma(W_f x_t + V_f h_{t-1} + b_f) \quad (2)$$

$$i_t=\sigma(W_i x_t + V_i h_{t-1} + b_i) \quad (3)$$

$$g_t=\tan h(W_g x_t + V_g h_{t-1} + b_g) \quad (4)$$

$$c_t = f_t \odot c_{t-1} + i_t \odot g_t \quad (5)$$

$$h_t = o_t \odot \tan h(c_t) \quad (6)$$

where Wo, Wi, Wf, Wg, ∈ $R^{d1 \times d2}$, Vo, Vf, Vi, Vg×$R^{d2 \times d2}$, bo, bg, bi, bg∈ $R^{d2}$ and ⊙ denotes element-wise multiplication and ot, ft and it are output, forget and input gates respectively. These values are bounded between zero and one and are used hereafter in element-wise multiplication.

For a classification problem as described herein (e.g., whether an outcome did or did not occur), after processing the full input text sequence by the LSTM model 702, the final state hT is used as a vector of learned features 706, and input to a multinomial logistic regression of a probability distribution module 708, to return a probability distribution 710 p over C classes, with:

$$p_j = \text{SoftMax}(Wh_T)_j = \frac{\exp(W_j h_T)}{\sum_{k=1}^{C} \exp(W_k h_t)} \quad (7)$$

Given such a model with these learned weights and a new sequence xq, ... xr, where 1≤q≤r≤T, contextual decomposition is used by a contextual decomposition module 712 to generate decomposition data 714 to break each output state (ht) and cell state (ct) in Equations 5 and 6 respectively into a sum of two contributions.

$$h_t = \beta_t + \gamma_t \quad (8)$$

$$c_t = \beta_t^c + \gamma_t^c \quad (9)$$

The decomposition data 714 is constructed so that βt corresponds to contributions made solely by the given phrase to ht, and that γt corresponds to contributions involving, at least in part, elements outside of the phrase. $\beta^c_t$ and $\gamma^c_t$ represent analogous contributions to ct.

Using this decomposition for the final output state WhT in Equation 7 yields:

$$p = \text{SoftMax}(W\beta_T + W\gamma_T) \quad (10)$$

Here WβT provides a quantitative score for the phrase's contribution to the model prediction. As this score corresponds the input to a logistic regression, it may be interpreted in the same way as a standard logistic regression coefficient.

In the update to Equation 5, neuron values in each of $i_t$ and $g_t$ are independently determined by both—the contribution at that step, $x_t$, as well as prior context provided by $h_{t-1} = \beta_{t-1} + \gamma_{t-1}$. Hence, while calculating the element-wise product $i_t \odot g_t$ (also known as gates), contributions due to $x_t$ for $i_t$ interact with contributions made by $h_t$ to $g_t$, and vice versa. This insight is leveraged in defining the decomposition. Assuming that the gates and updates in Equations 2, 3 and 4 can be linearized such that each of these are written as a linear sum of contributions from each of the respective inputs.

$$i_t = \sigma(W_i x_t + V_i h_{t-1} + b_i) \quad (11)$$

$$= L_\sigma(W_i x_t) + L_\sigma(V_i h_{t-1}) + L_\sigma(b_i) \quad (12)$$

When this linearization is used in the cell update Equation 5, the products between gates become products over linear sums of contributions from different factors. Upon expanding these products, the resulting cross-terms yield a natural interpretation as being interactions between variables. In particular, cross-terms can be assigned as to whether the cross-terms resulted solely from the phrase (or words), from some interaction between the phrase and other factors, or purely from other factors. This insight supports a recursive computation of the decomposition, with the initializations $\beta_0 = \beta_0^c = \gamma_0 = \gamma_0^c = 0$. The following equation is derived for the case where $q \leq t \leq r$, so that the current time step is contained within the phrase.

For clarity, the two products in the cell update Equation 5 are decomposed separately. As discussed above, the gates involved are linearized and the resulting product of sums expanded. The cross-terms are grouped according to whether or not respective contributions derive solely from the specified phrase, or otherwise. Terms are determined to derive solely from the specified phrase if involving products from some combination of $\beta_{t-1}$, $\beta_{t-1}^c$, $x_t$ and $b_i$ or $b_g$ (but not both). When t is not within the phrase, products involving xt are treated as not deriving from the phrase (or words being considered).

$$f_t \odot c_{t-1} = (L_\sigma(W_f x_t) + L_\sigma(V_f \beta_{t-1}) + L_\sigma(V_f \gamma_{t-1}) + L_\sigma(b_f)) \otimes (\beta_{t-1}^c + \gamma_{t-1}^c) \quad (13)$$

$$= ([L_\sigma(W_f x_t) + L_\sigma(V_f \beta_{t-1}) + L_\sigma(b_f)] \beta_{t-1}^c) + (L_\sigma(V_f \gamma_{t-1}) \beta_{t-1}^c + f_t \gamma_{t-1}^c) \quad (14)$$

$$= \beta_t^f + \gamma_t^f \quad (15)$$

$$i_t \odot g_t = [L_\sigma(W_i x_t) + L_\sigma(V_i \beta_{t-1}) + L_\sigma(V_i \gamma_{t-1}) + L_\sigma(b_i)] [L_{\tan h}(W_g x_t) + L_{\tan h}(V_g \beta_{t-1}) + L_{\tan h}(V_g \gamma_{t-1}) + L_{\tan h}(b_g)] \quad (16)$$

$$= [L_\sigma(W_i x_t)] [L_{\tan h}(W_g x_t) + L_{\tan h}(V_g \beta_{t-1}) + L_{\tan h}(b_g)] + L_\sigma(V_i \beta_{t-1}) [L_{\tan h}(W_g x_t) + L_{\tan h}(V_g \beta_{t-1}) + L_{\tan h}(b_g)] + L_\sigma(b_i) [L_{\tan h}(W_g x_t) + L_{\tan h}(V_g \beta_{t-1})]] + [L_\sigma(V_i \gamma_{t-1}) g_t + i_t L_{\tan h}(V_g \gamma_{t-1}) - L_\sigma(V_i \gamma_{t-1}) L_{\tan h}(V_g \gamma_{t-1}) + L_\sigma(b_i) L_{\tan h}(b_g)] \quad (17)$$

$$= \beta_t^u + \gamma_t^u \quad (18)$$

Having decomposed the two components of the cell update equation, the decomposition of ct is obtained by summing the contributions.

$$\beta_t^c = \beta_t^f + \beta_t^u \quad (19)$$

$$\gamma_t^c = \gamma_t^f + \gamma_t^u \quad (20)$$

Once decomposition of et is computed, the resulting transformation of ht is computed by linearizing the tan h function in Equation 6 by a quantitative score module 718 to generate the attribution score 720.

Note that while the equations here are presented in the context of a LSTM model 702, these equations but can be implemented on other machine-learning models as-is as described in relation to an example 900 of FIG. 9 for a CNN. Thus, these same equations may be implemented for model variants of LSTM architectures similar to the above discussed equations.

$$h_t = o_t \odot \tan h(c_t) \quad (21)$$

$$= o_t \odot [L_{\tan h}(\beta_t^c) + L_{\tan h}(\gamma_t^c)] \quad (22)$$

$$= o_t \odot L_{\tan h}(\beta_t^c) + o_t \odot L_{\tan h}(\gamma_t^c) \quad (23)$$

$$\beta_t + \gamma_t \quad (24)$$

FIG. 9 depicts an example implementation 900 in which a convolutional neural network (CNN) 902 is used by the machine-learning module 702 to generate an attribution score. In case of a CNN 902, contextual decomposition is implemented for word and phrase level scores by the contextual decomposition module 712. A CNN 902 in the illustrated example includes the convolution 904 itself, an activation function 906 and may also include a max pooling operation 908 to generate learned features 706. The decomposition for each of these is described as follows.

For decomposing the convolution of the learned features 706 by a contextual decomposition module 712 in this example, given a sequence of word embeddings x1, ..., xT ∈ $R_1^d$ of length T, the convolution of size n of a single filter is computed over the sequence $x_{1:T}$ by applying the following equation to each n-length subsequence {$x_{t+1}$, i=0 ... n−1}, denoted by $x_{t:t+n-1}$ $$Z_t = \sum_{i=0}^{n-1} W_i \cdot x_{t+1} + b \quad (25)$$

with $z_t \in R$ where $W \in R^{\wedge}(d_{1 \times n})$ and $b \in R$ are the weight matrix and the bias of the convolutional filter respectively. $W_i$ represents the i-th column of the weight matrix W. When the contribution of the subset of words is calculated, where S is the set of corresponding word position indexes and $S \subseteq \{1, \ldots, T\}$, the output of the filter $z_t$ is decomposed into three parts:

$$z_t = t + \gamma_t + b \quad (26)$$

That is, the relevant contribution βt originating from the selected subset of words with indexes S, the irrelevant contribution γt originating from the remaining words in the sequence, and a bias which is considered neutral. This is achieved by decomposing the convolution itself by the contextual decomposition module 712:

$$\beta = \sum_{i=0}^{n-1} W_i \cdot x_{t+1} \quad (t+1) \in S \quad (27)$$

-continued $$\gamma = \sum_{i=0}^{n-1} W_i \cdot x_{t+1} \quad (t+1) \notin S \tag{28}$$

The next step, similar to the one for LSTM model 702 as described in relation to FIGS. 6-7, is linearizing the activation function 906 by an activation linearization module 910. In case of a CNN 902, a ReLU activation function may be used. In case of a LSTM model 702, the linearization is based on the differences of partial sums. For the CNN 902, the non-linear activation function $$f, f_{ReLU}(z_t) = f_{ReLU}\left(\sum_{i=1}^{N} y_i\right)$$

is split into a sum of individualized linear components $L_{fReLU}(y_i)$, where N is the number of all components $y_i$ involved in the pre-activation sum $z_t$. $L_{fReLU}(y_i)$ is given be $$f_{ReLU}\left(\sum_{i=1}^{N} y_i\right) = \sum_{i=1}^{N} L_{fReLU}(y_i) \cdot L_{fReLU}(y_k),$$

the linearized contribution of $y_k$ is computed as the average difference of partial sums over all permutations $\pi 1, \ldots \pi\_M_N$ for each of the N components $y_i$ involved:

$$L_f(y_k) = \frac{1}{M_N} \sum_{i=1}^{M_N} \left[ f\left(\sum_{l=1}^{\pi_i^{-1}(k)} y_{(\pi_i)}(l)\right) - f\left(\sum_{l=1}^{\pi_i^{-1}(k-1)} y_{(\pi_i)}(l)\right) \right] \tag{29}$$

Finally the output $c_t$ is decomposed as follows by the contextual decomposition module 712:

$$c_t = f_{ReLU}(z_t) \tag{30}$$

$$= f_{ReLU}(\beta_{z,t} + \gamma_{z,t} + b) \tag{31}$$

$$= L_{ReLU}(\beta_{z,t}) + L_{ReLU}(\gamma_{z,t}) + L_{ReLU}(b) \tag{32}$$

$$\beta_{c,t} + \gamma_{c,t} \tag{33}$$

Note that, similar to LSTM model 702, $\beta_{c,t}$ contains contributions that can be directly attributed to the specific set of input indexes S. Hence, the bias b is a part of $\gamma_{c,t}$·$c_t$ for a CNN 902 is the parallel to $h_t$ in an LSTM model 702 (refer equation 24).

The final layer, in both the CNN and an LSTM, is the classification layer as implemented by the quantitative score module 718 to generate the attribution score 912. The probability $p_j$ of predicting class j is given by:

$$p_j = \left(\frac{e^{W_j \cdot x + b_j}}{\sum_{i=1}^{C} e^{W_i \cdot x + b_i}}\right) \tag{34}$$

where, $W \in R^{d_2 \times X}$ is a weight matrix and $W_i$ is the i-th column, $x \in R^{d_2}$ is the input, $b \in R^{d_2}$ is the bias vector and $b_i$ the i-th element, $d_2$=input vector size and C the total number of classes. The input x is either the out of h in an LSTM model 702 or c in a CNN 902. The value x is decomposed into $\beta$ and $\gamma$. In one implementation, the pre-activation is considered, solely, and is decomposed as follows.

$$W_j \cdot x + b_j = W_j \cdot \beta + W_j \cdot \gamma + b_j \tag{35}$$

Finally, the contribution of a set of words with indices S to the final score for class j is equal to $W_j \cdot \beta$. This attribution score is used for visualization as part of generating the attribution representations. As described above, attribution scores may be computed at sentence-level, word-level or phrasal level. For each scenario, the input text is demarcated into the respective levels and each level is taken as an independent sequence to compute the attribution score. For example, sentence level attributions may be obtained by splitting the input into sentences and considering each sentence therein as the desired sequence for attribution. The attributions can thus be done at word-level and phrase level as well.

The output of the algorithm is an attribution score 912 associated with each component being considered. For example, if a word is considered as a component the techniques described herein output a score associated with each word in the input text. The score signifies relative important of a particular word for a given machine-learning model in predicting a specific class, e.g., whether an outcome did or did not occur. For example, consider a given input sentence—"Even (0.02) in (0.00) the (−0.15) most (0.34) tedious (−1) scenes (0.19), (−0.01) Russian (0.51) ark (0.58) is (−0.11) mesmerizing (0.89). (0.00)." The numbers in the respective brackets indicate the normalized attribution scores associated with each word as generated by the LSTM model 702 of FIGS. 7 and 8.

This output enables a content creator to examine each word of the subject data and determine attribution of the word on the corresponding prediction. This may also be leveraged to provide suggestions on what words or components are to be edited in order to change or influence a given model prediction. These may also be used directly to generate attribution recommendations 316 as authoring cues to suggest changes to be made to the subject data. Thus, as described in this section a variety of different models may employ contextual decomposition to generate word attribution predictions. Techniques are described in the following section that may be used to evaluate effectiveness of these machine-learning models 128.

Digital Attribution System Machine-Learning Model Comparison

Figure 10:
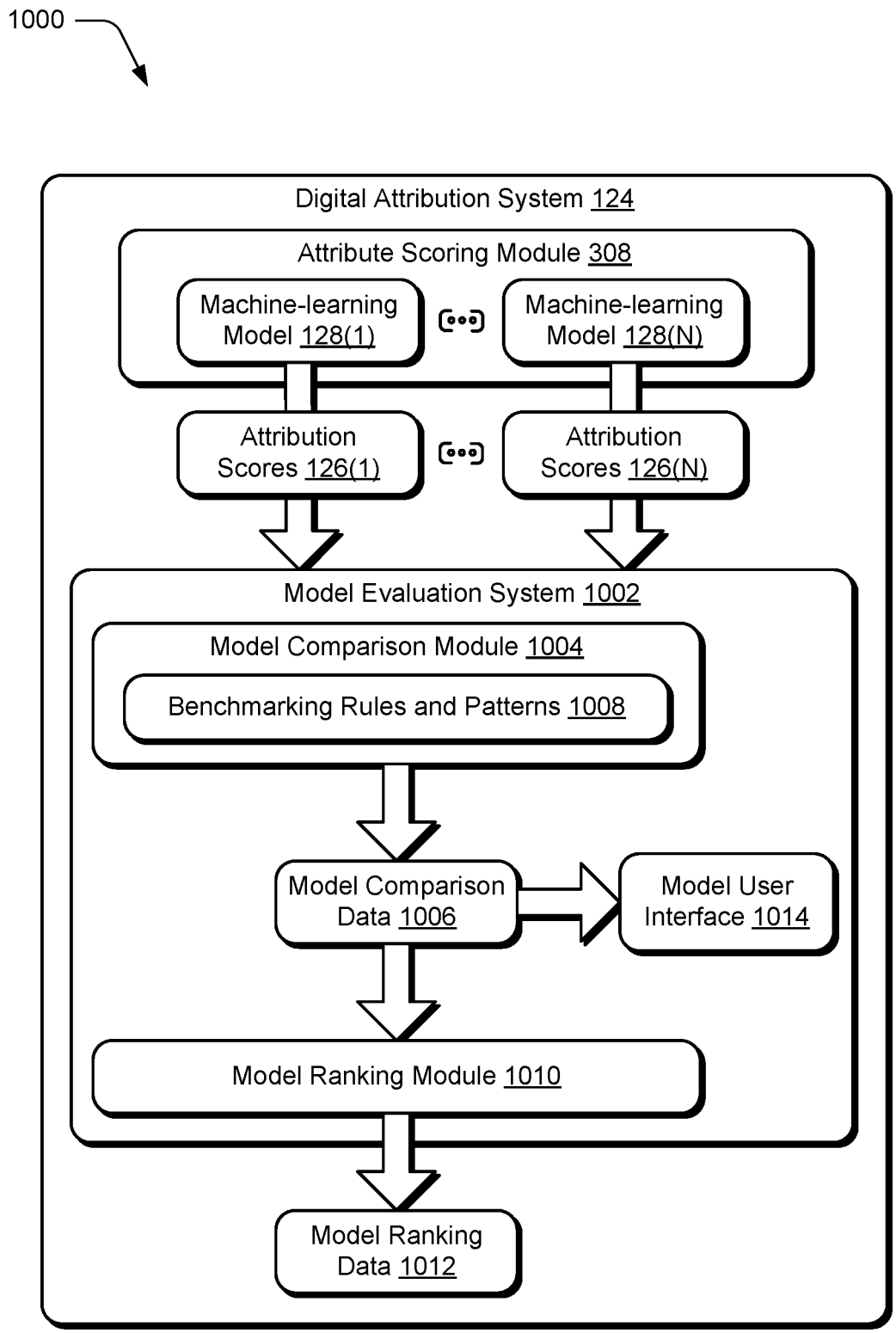
FIG. 10 depicts a system in an example implementation showing the digital attribution system of FIG. 1 as employing machine-learning model attribution comparison techniques.

FIG. 10 depicts a system 1000 in an example implementation showing the digital attribution system 124 as employing machine-learning model attribution comparison techniques. FIG. 11 depicts an example 1100 of a user interface configured to support machine-learning model comparison for attribution score generation.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 10-11.

Prediction accuracies are not the sole indicator of machine-learning model 128 performance—particularly when the model performances vary at fractional levels. Also, higher accuracies may arise due to over fitting or erroneous learning as well. Accordingly, techniques are described in this section to check for such errors and provide a qualitative way of ranking machine-learning models 128 with respect to word attribution prediction accuracy.

Given a set of subject data 116 in the previous section, attribution scores 126 are generated (at various levels) using machine-learning models 128 and contextual decomposition. In the techniques described in this section, the attribution scores 126 are used to provide a ranking for the machine-learning model 128 quality for a given task, rules, and dataset combination.

To begin in this example, an attribution scoring module 308 employs a plurality of machine-learning models 128(1)-128(N) to generate respective attribution scores 126(1)-126(N). The plurality of machine-learning models 128(1)-128(N), for instance, may be maintained as part of a "model zoo" or "catalog" having each of the possible models available to the digital attribution system 124. This may include models generated by the same architecture at different periods of time (e.g., epochs), models generated by different architectures, and so on. In this example, each of these models involve the same outcome, e.g., subject data prediction.

The attribution scores 126(1)-126(N) may be associated with the data at various granularities as calculated by contextual decomposition. Examples of these granularities include word-level, phrase-level or sentence-level attributions.

The attribution scores 126(1)-126(N) are then provided to a model evaluation system 1002 to evaluate effectiveness of the various models on performing their tasks. To do so, a model comparison module 1004 is employed to generate model comparison data 1006 based on benchmarking rules and patterns 1008. The model comparison data 1006, for instance, may be used by a model ranking module 1010 to generating model ranking data 1012 that ranks the models on their effectiveness, e.g., from high to low. The model comparison data 1006 may also be rendered in a model user interface 1014 to show effectiveness of the models on various word attribution prediction tasks.

As part of this, the model comparison module 1004 first identifies the words with high attribution scores 126(1)-126(N) (e.g., the highest "N" scores, an amount above a threshold, etc.) for each machine-learning model 128(1)-128(N). Let the attribution score 126(1)-126(N) for all words in the set of subject-lines for a model m be W(m). For every $w_i \in W$ if $|w_i| > \alpha$ (chosen empirically) then w is a high attribution word. The higher the number of high attribution words the more confident the machine-learning model 128(1)-128(N) is in learning the task. The higher the consistency in the aggregate magnitude and count of these words, the higher the model comparison score $\mu_m$.

$$\mu_{att} = \frac{W_a(m)}{W(m)}$$

where $W_a(m) = \Sigma w_i$ for $\forall w_i \in W$ s. t. $|w_i| > \alpha$ & (m) is sum of all words (w) in the content. $\alpha$ is decided empirically based on a dev set and typically set to a value greater than 0.5*max(attributionscore)

Benchmarking rules and patterns 1008 refer to language related patterns such as—"Are the adjectives in the sentences given a high importance," or have increased complexity such as "Do adversative conjunctions (like 'but') reduce the magnitude of the importance score of the phrase in its scope?" that are known to be true if the model is learning the task correctly. The benchmarking rules and patterns 1008 may be defined based on NLP grammar rules, may be received as a user input from an expert in the domain, and so on. The rules and patterns, therefore, are benchmarks codified usually through experience or theories to check if the machine-learning model is functioning as expected.

Similar to the attribution score, the machine-learning model 128(1)-128(N) performance is measured with respect to these benchmark patterns using a model score as part of the model comparison data 1006. The model score is calculated using the benchmark. Domain and dataset dependent rules or patterns may also be input, e.g., by a domain-expert. Each pattern, when queried, is used to output the percentage of data samples for which each machine-learning model 128(1)-128(N) captures that pattern correctly. The model comparison data 1006 (e.g., as a model score) may then be based on the following, (1) if a model, adheres a to maximum number of rules, if all rules are deemed equally important for all p∈P; and (2) gets a maximum weighted average score where weights of the rules can be decided by the user.

The model score is then defined as:

$$\mu_p = \frac{\sum (1 + e^{\beta_i}) k_i p_i}{n}$$

for $\forall$ rule $p_i \in P$, $k_i$=percentage of data samples that capture the pattern correctly and n=|P|. The model score is 0 if no patterns are specified or detected correctly. β_i is a user defined rule priority, having a default value of β_i=0. The final model score ($\mu_m$) may therefore be defined as:

$$\mu = \mu_{att}(1 + \log(\mu_p))$$

As shown in the example 1100 user interface of FIG. 11, model scores of the model comparison data 1006 may then be used to provide a variety of insights. In the illustrated example, the user interface 1014 is configured to support user inputs to select particular models and show an effect of those models on accuracy across epochs, a number of high attribution words, and so on. As a result, a user may gain insight in which models are desired for use in measuring a likelihood of a particular outcome, which is not possible using conventional techniques.

Example System and Device

Figure 12:
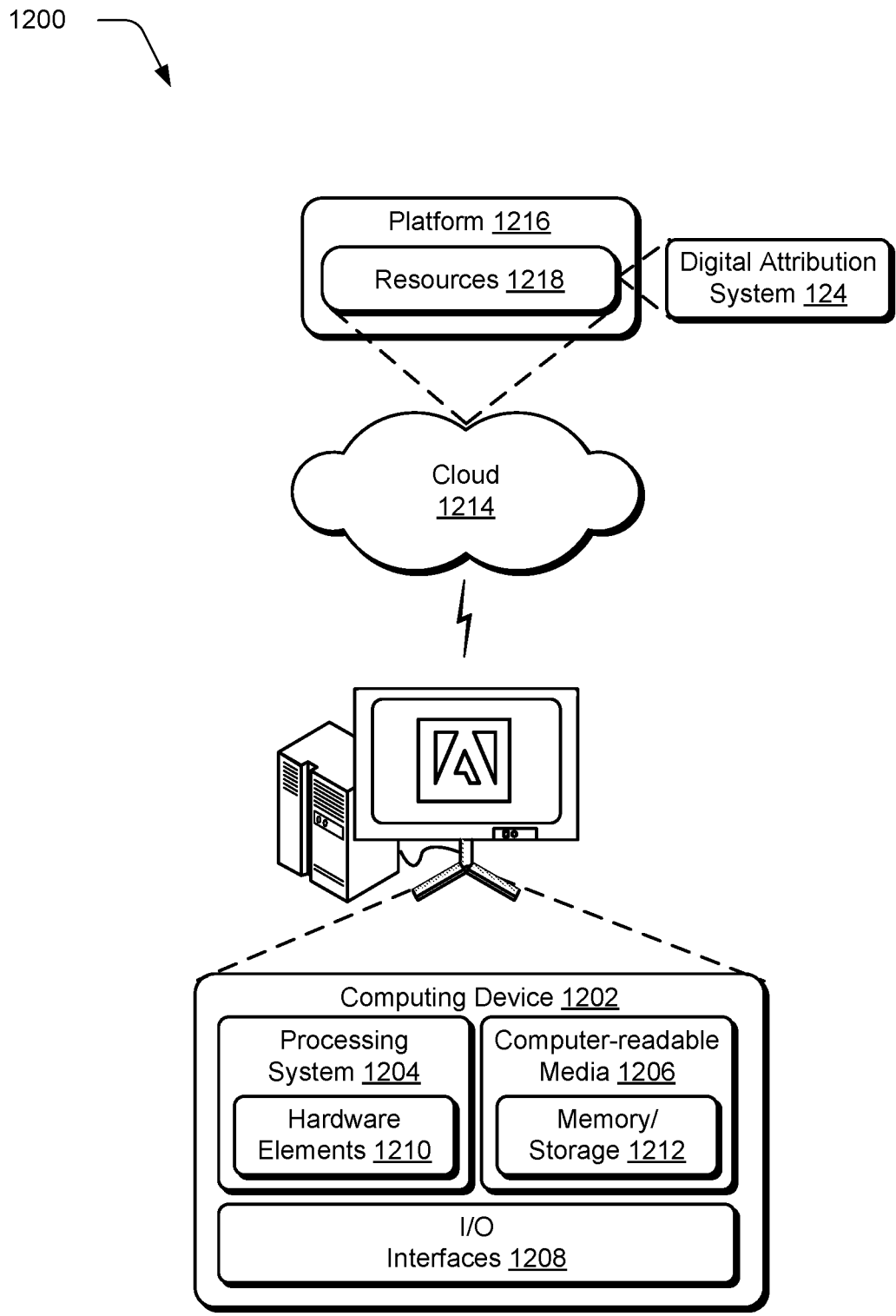
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the digital attribution system 124. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    collecting, by the computing device, training data that includes word and outcome data;
    training, by the computing device, a machine-learning model by tuning a computer representation based on the training data, the training performed to configure the machine-learning model to learn to generate attribution scores based the word and outcome data of the training data;
    receiving, by the computing device, subject data that corresponds to digital content, the subject data including a plurality of words;
    generating, by the computing device, a plurality of attribution scores using the trained machine-learning model, each attribution score of the plurality of attribution scores describing a respective amount that a respective said word in the subject data contributes toward performance of an outcome;
    generating, by the computing device, a plurality of representations based on the plurality of attribution scores, each representation of the plurality of representations including the respective amount that the respective said word in the subject data contributes toward performance of the outcome;
    generating, by the computing device, an attribution recommendation based on at least one said attribution score, the attribution recommendation indicating a change to be made to at least one said word to increase a probability of achieving performance of the outcome; and
    outputting, by the computing device, the plurality of representations and the attribution recommendation for display in a user interface concurrently with the subject data as indicating the respective amounts that the respective said words in the subject data and the at least one said word contributes toward performance of the outcome.

2. The method as described in claim 1, wherein the outcome includes receiving a selection of the subject data via a user interface to open the digital content.

3. The method as described in claim 2, wherein the subject data is a subject line of the digital content, the digital content configured as a digital message.

4. The method as described in claim 2, wherein the subject data is a title of the digital content.

5. The method as described in claim 1, wherein the plurality of representations is configured to indicate a positive, negative, or neutral amounts that the respective said word in the subject data contributes toward performance of the outcome.

6. The method as described in claim 1, wherein the plurality of representations further indicates a respective amount that a phrase including a subject of the plurality of words contributes toward performance of the outcome.

7. The method as described in claim 1, wherein the plurality of representations further indicates a respective amount that the plurality of words as a whole contributes toward performance of the outcome.

8. The method as described in claim 1, wherein the attribution recommendation indicates the change using text describing an effect of the at least one word on the achieving of the outcome.

9. The method as described in claim 1, wherein the generating the plurality of attribution scores is performed by a plurality of different machine-learning models, respectively.

10. The method as described in claim 9, wherein the plurality of different machine-learning models includes convolutional neural network (CNN) and a long short-term memory (LSTM) neural network.

11. A system comprising:
    a training data collection module implemented by a computing device to collect training data that includes word and outcome data;
    a model training module implemented by the computing device to train a plurality of machine-learning models based on the training data, the training performed to configure the plurality of machine-learning models to learn to generate outputs as attribution scores that reflect patterns and attributes of the training data on achieving the outcome described by the outcome data;
    an input module implemented by the computing device to receive subject data that corresponds to digital content, the subject data including a plurality of words;
    an attribute scoring module implemented by the computing device to generate a plurality of attribution scores using a plurality of different types of machine-learning models, respectively, each attribution score of the plurality of attribution scores describing a respective amount that a respective said word in the subject data contributes toward performance of an outcome;

an attribute recommendation module implemented by the computing device to generate an attribution recommendation based on at least one said attribution score, the attribution recommendation indicating a change to be made to at least one said word in the subject data to increase a probability of achieving performance of the outcome and an indication of a corresponding change to the at least one said attribution score based on the change; and an attribute representation module implemented by the computing device to generate a plurality of representations based on the plurality of attribution scores, each representation of the plurality of representations including the respective amount that the respective said word in the subject data contributes toward performance of the outcome.

12. The system as described in claim 11, wherein the plurality of different machine-learning models includes convolutional neural network (CNN) and a long short-term memory (LSTM) neural network.

13. The system as described in claim 11, wherein the outcome includes receiving a selection of the subject data via a user interface to open the digital content.

14. The system as described in claim 11, wherein the subject data is a subject line of the digital content, the digital content configured as an email.

15. The system as described in claim 11, wherein the subject data is a title of the digital content.

16. The system as described in claim 11, wherein the plurality of representations is configured to indicate an amount to which the respective said word in the subject data contributes toward performance of the outcome.

17. The system as described in claim 11, wherein the plurality of representations further indicates a respective amount that a phrase including a subject of the plurality of words contributes toward performance of the outcome.

18. The system as described in claim 11, wherein the plurality of representations further indicates a respective amount that the plurality of words as a whole contributes toward performance of the outcome.

19. One or more computer-readable storage media storing instructions that, responsive to execution by a processing system, causes the processing system to perform operations including:

collecting training data that includes word and outcome data;

training a machine-learning model by tuning a computer representation based on the training data, the training performed to configure the machine-learning model to learn to generate attribution scores based the word and outcome data of the training data;

receiving subject data that corresponds to digital content, the subject data including a plurality of words;

generating a plurality of attribution scores using the trained machine-learning model, each attribution score of the plurality of attribution scores describing a respective amount that a respective said word in the subject data contributes toward performance of an outcome;

generating a plurality of representations based on the plurality of attribution scores, each representation of the plurality of representations including the respective amount that the respective said word in the subject data contributes toward performance of the outcome;

generating an attribution recommendation based on at least one said attribution score, the attribution recommendation indicating a change to be made to at least one said word to increase a probability of achieving performance of the outcome; and outputting the plurality of representations and the attribution recommendation for display in a user interface concurrently with the subject data as indicating the respective amounts that the respective said words in the subject data and the at least one said word contributes toward performance of the outcome.

20. The one or more computer-readable storage media as described in claim 19, wherein at least one said attribution score is displayable as a gauge in a user interface.

* * * * *